United States Patent
Wicks et al.

[11] Patent Number: 5,884,155
[45] Date of Patent: Mar. 16, 1999

[54] PAGER WITH COIN HOLDER AND/OR STORAGE COMPARTMENT

[75] Inventors: James E. Wicks, San Francisco, Calif.; Eduardo Sciammarella, New York, N.Y.

[73] Assignees: Sony Coporation, Tokyo, Japan; Sony Electronics, Inc., Park Ridge, N.J.

[21] Appl. No.: 816,937

[22] Filed: Mar. 14, 1997

[51] Int. Cl.⁶ ..................................................... H04B 1/08
[52] U.S. Cl. .............................. 455/347; 455/90; 455/344
[58] Field of Search ................................ 455/550, 556, 455/575, 90, 347–351, 344, 66; 206/0.8, 0.81, 0.83, 0.84; 453/47, 48, 50; 224/679, 929, 930; D14/191; 340/311.1, 825.44, 309.15

[56] References Cited

U.S. PATENT DOCUMENTS

| | | | |
|---|---|---|---|
| D. 352,666 | 11/1994 | Williams . | |
| D. 368,909 | 4/1996 | Fonseca et al. . | |
| 566,224 | 10/1896 | ul Azam et al. | 455/90 |
| 2,388,221 | 10/1945 | Smith | 453/50 |
| 2,553,257 | 5/1951 | Honeyman | 206/0.83 |
| 2,569,629 | 5/1951 | Everitt | 453/50 |
| 4,225,965 | 9/1980 | Baugh . | |
| 4,781,290 | 11/1988 | Oliphant | 206/0.83 |
| 4,951,817 | 8/1990 | Barletta et al. | 224/930 |
| 4,977,614 | 12/1990 | Kurcbart . | |
| 5,114,014 | 5/1992 | Ascalon et al. | 206/0.84 |
| 5,398,855 | 3/1995 | Schaiewitz . | |
| 5,443,193 | 8/1995 | Lenard | 206/0.81 |
| 5,499,429 | 3/1996 | Higginbotham . | |
| 5,499,710 | 3/1996 | Hoffman | 206/0.81 |
| 5,589,812 | 12/1996 | Jones | 340/309.15 |

*Primary Examiner*—Reinhard J. Eisenzopf
*Assistant Examiner*—Lester G. Kincaid
*Attorney, Agent, or Firm*—Ronald P. Kananen

[57] ABSTRACT

A combination of a pager with a casing having a first portion releasably secured to a second portion together defining a cavity therein serving as a compartment for storage of articles of convenience for the user. A pager is included within a portion of the cavity defined by the first portion. A coin holder is defined by the second portion of the casing, either on an exterior surface or on an interior major surface of the casing.

14 Claims, 3 Drawing Sheets

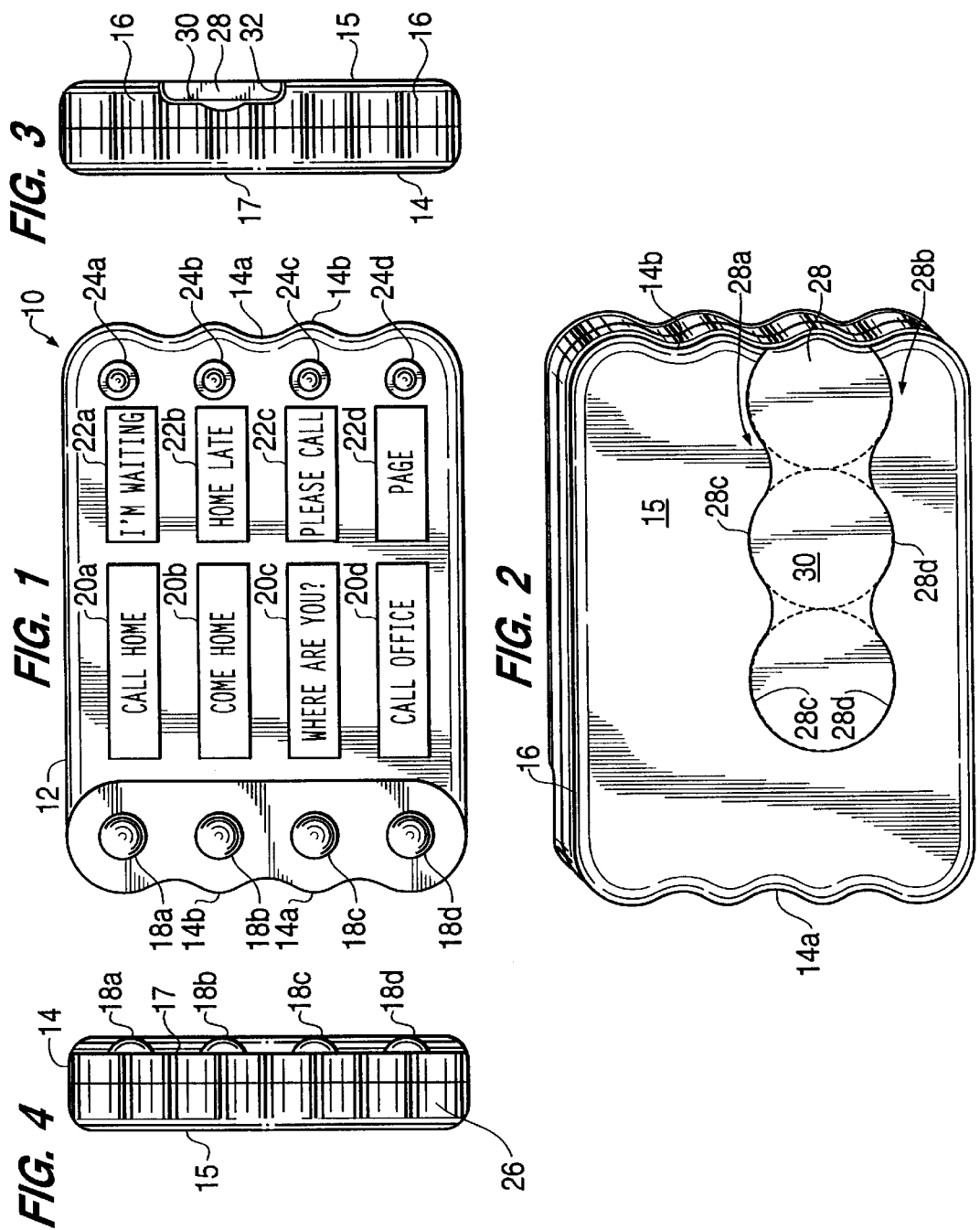

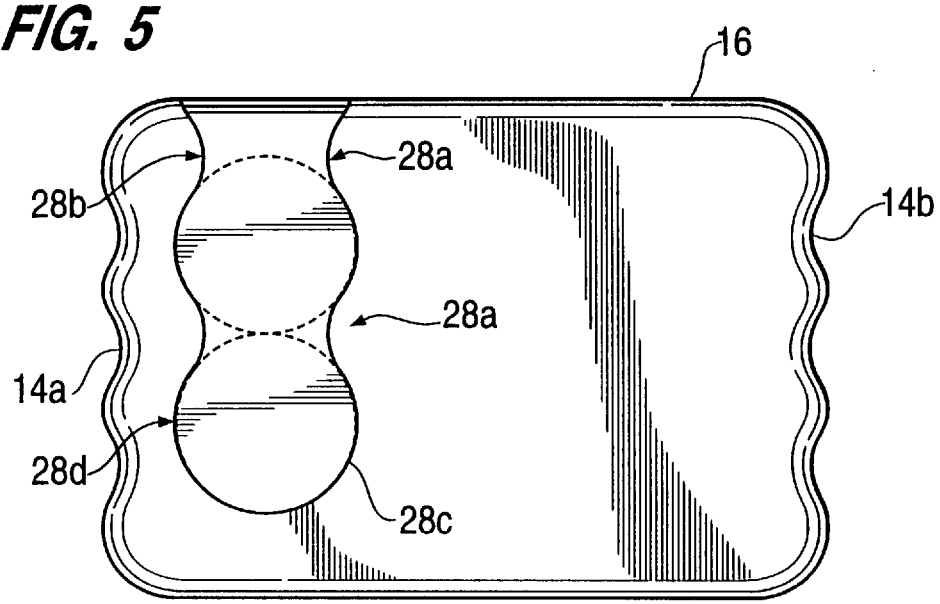
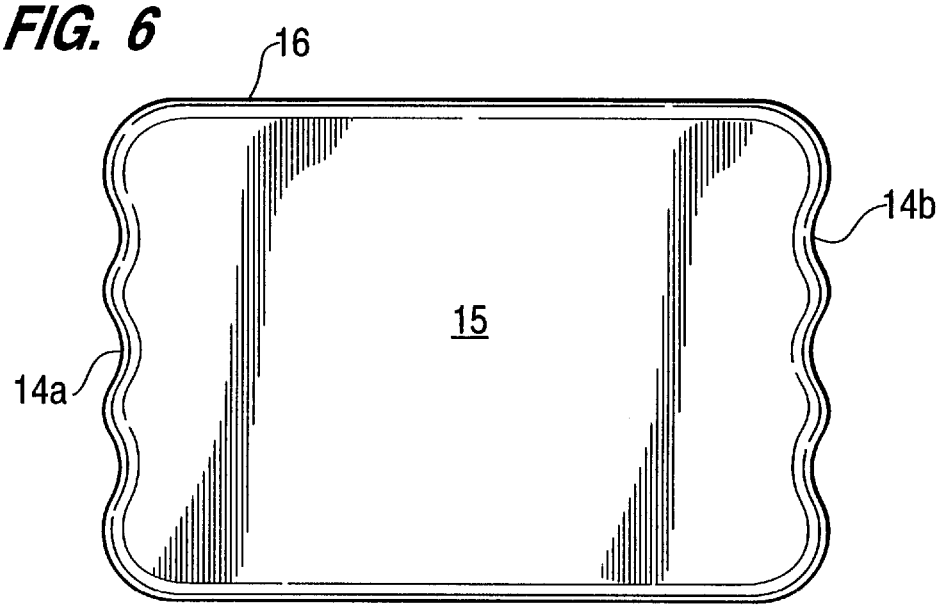

PAGER WITH COIN HOLDER AND/OR STORAGE COMPARTMENT

BACKGROUND OF THE INVENTION

This invention relates to a pager in combination with a coin holder. More particularly, this invention relates to a pager in combination with a pocket-sized casing having a coin holder as a part of the casing. Still more particularly, this invention relates to such a combination in which the casing further defines a cavity having storage capabilities. Still more particularly, this invention relates to a pager in combination with a casing having an interior compartment for holding articles, such as identification.

BRIEF DESCRIPTION OF THE RELATED ART

Portable radio receivers and transceivers, such as wireless pagers, have become increasingly popular as a means of communication. Pagers are typically carried by users who wish or need to receive communications when away from a telephone or computer, or are unable to predict where they may be reached at a given time. Pager systems able to communicate with a pager at the site of a user are well known; for example, the user of a pager may purchase or lease a pager unit and enter into a contract with a service provider.

Such units are tending toward miniaturization to a size able to be carried conveniently on the person of the user, such as by being attached to a belt or other fixing location on the user, or by being carried in a pocket in the garments or shirt worn by the user.

However, pagers do not generally have storage capabilities except for information capable of being placed in its memory if the pager is a two-way pager. Thus, it would be convenient for a user to have a pager which is able to store coins, or contain written information such as identification, a driver's license, or the like. When jogging, for example, it would be convenient for a user to have such capabilities of receiving or sending a page quickly through the paging system, storing coins, and storing information such as identification. In the main, pagers have not previously been provided in combination with such features.

On the other hand, coin holders of numerous sizes, shapes, and configurations are known to the art. Such coin holders usually act only as a coin holder. However, coin holders have been provided in combination with a dispenser as suggested by U.S. Pat. No. 5,499,710 to Hoffman, issued on Mar. 19, 1996.

Thus, it is a shortcoming in the art that pagers do not include the convenience of storing coins and providing storage capabilities for items such as identification, driver's licenses, and the like.

BRIEF SUMMARY OF THE INVENTION

Directed to overcoming the shortcomings of the prior art and providing features in a pager not currently found, this invention relates in one of its aspects to the combination of a pager with a coin holder provided, such as by molding, either in an exterior wall of or the interior of the casing. In another aspect, the invention relates to a pager in combination with a casing suitably sized to be carried in a pocket of a user or on the person of the user and having a physical capability of providing an accessible cavity for storing articles, such as identification. Still further, another aspect of the invention relates to the combination of a pager with a coin holder and a cavity in a casing suitable for receiving such articles as identification for example.

Thus, it is an overall object of this invention to provide a pager in combination with a coin holder.

It is another overall object of this invention to provide a pager in combination with a casing sized for being carried conveniently in a pocket or on the person of a user, wherein the casing includes a selectively accessible cavity for storing articles for the convenience of the user, such as identification.

It is another overall object of this invention to provide a pager in combination with a coin holder defined in a casings as mentioned above.

In a first aspect, the invention relates to a combination of a pager and a coin holder, comprising a casing having a first portion and a second portion releasably engaging the first portion, the first portion and the second portion together defining a cavity within the casing; a pager located substantially in the portion of the cavity defined by the first portion, wherein communication features of the pager are positioned at an outer surface of the first portion; and a coin holder defined substantially by the second portion for releasably holding a plurality of predetermined coins. The coin holder is defined in an outer surface of the lower portion of the casing, or in the interior of the lower portion of the casing, perpendicular to either a longer or shorter wall of the casing.

Preferably, the coin holder is molded to the second portion of said casing and defines a plurality of coin-holding locations sized to frictionally engage coins of the same denomination in each location. If desired, each of said coin-holding locations includes a finger-accessing portion accessing the coin holding location to assist retrieving coins from said coin holder.

In more detail, the combination of a pager and a coin holder according to the invention comprises a casing having a first portion and a second portion releasably engaging the first portion, the first portion and the second portion together defining a cavity within the casing, the first portion defining a first outer surface of the casing, the second portion defining a second outer surface of the casing, the casing having a rectangular configuration with a longer side and a shorter side; a pager located substantially in the portion of the cavity defined by the first portion, wherein communication features of the pager are positioned at an outer surface of the first portion, the communication features including displays for messages and means for sending messages by enabling a switch; and a coin holder defined substantially by the second portion for releasably holding a plurality of predetermined coins, the coin holder having a pair of opposed walls respectively defining apexes and nadirs along a given direction, the opposed apexes defining arcs of a circle having a diameter corresponding to the diameter of a coin of a predetermined denomination to be frictionally engaged by said opposed arc, the coin holder having a thickness defined by the second portion for holding more than one coin of said predetermined denomination, but less than the thickness of said second portion of said casing.

In another aspect, the pager according to the invention need not include a coin holder with the compartment feature. Thus, in this embodiment, the pager comprises a casing having a first portion and a second portion releasably engaging the first portion, the first portion and the second portion together defining a compartment within the casing, the cavity structurally sized to receive articles of personalty of a user, such as identification; and a pager located substantially in the portion of the cavity defined by said first portion, wherein communication features of said pager are positioned at an outer surface of said first portion.

These and other objects of the invention will be seen from a detailed review of this written description of the invention and the accompanying drawings.

BRIEF DESCRIPTION OF THE DRAWINGS

The accompanying drawings illustrate the invention and are a part of the specification. Together with the following description, the drawings demonstrate and explain the principles of the invention. In the drawings:

FIG. 1 is a front view of a pager according to the invention with a casing having both a compact compartment and a coin holder therein;

FIG. 2 is a rear view of a pager according to the invention as shown in FIG. 1 with a casing having both a compact compartment and a coin holder therein;

FIG. 3 is a right side view of the pager according to the invention with a casing having both a compact compartment and a coin holder therein;

FIG. 4 is a left side view of the pager according to the invention with a casing having both a compact compartment and a coin holder therein;

FIG. 5 is a plan view of the pager according to the invention similar to FIG. 4, but with the coin holder positioned parallel to the short side of the pager on either the exterior or interior of the casing;

FIG. 6 is a bottom view of the casing of an alternative embodiment of the invention showing no coin holder provided therein, thus illustrating the appearance of the external casing when the coin holder is in the interior of the casing, and when no coin holder is included, so that the casing provides a convenient interior compartment;

DETAILED DESCRIPTION OF THE PREFERRED EMBODIMENTS

Figure 8:
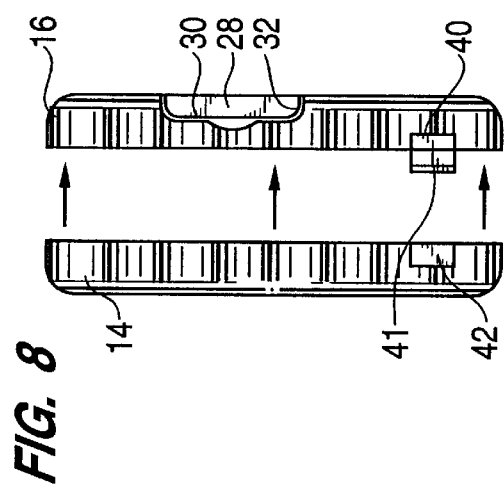
FIG. 8 is an illustrative view showing an example of the ability of the upper portion of the casing to separate from the lower portion, thus revealing an interior compartment for storage of articles of convenience to the user, with a representative releasable latch member.

FIG. 1 shows a front view of pager designated generally by the reference numeral 10 (not shown in detail) in a casing 12 having an upper portion 14 and a lower portion 16, made for example of a suitable molded plastic not critical to the invention. In general, the pager 10 is located and otherwise occupies some or all of the interior of the upper portion 14 of the casing 10.

The outer surface 17 of the upper portion 14 of the casing 10 includes a plurality of indicators 18a through 18d respectively indicating one or more messages on suitable associated display members 20a through 20d. A plurality of representative messages are shown, one or more of which is displayed by operation of the pager and providing a suitable message. When a message is provided, the associated indicator 18a through 18d is illuminated to catch the attention of the user. If desired, the indicators may be maintained in an "off" attitude until turned "on" by the user but preferably are always on to alert the user to such message. If additionally desired, the messages may be scrolled by operation of a suitable actuator, not shown. Preferably, the indicators 18a through 18d are light emitting diodes (LEDs) to minimize battery drain between charges of the battery in the pager.

At the right side of the outer surface 17 of the upper casing 14 of the pager 10, a plurality of preprogrammed messages and destinations may be programmed, as shown representatively by the plurality of displays 22a to 22d initiated by an associated pushbutton 24a to 24d. Actuation of one of the pushbuttons 24a to 24d will thus initiate and send the message on the associated display 22a to 22d. Such capabilities for a pager are within the skill in the art.

The opposed edges of the casing 10 at both of the upper portion 14 and the lower portion 16 may be formed in an undulating pattern, as shown at the representative nadirs 14a and apexes or peaks 14b of the undulating pattern and by the associated shade lines of FIGS. 3 and 4. This pattern facilitates gripping the pager and assisting in opening the interior of the pager to show the interior compartment 26 defined by at least the lower casing 16.

The casing 12 is suitably sized to be carried conveniently in a hand of the user, or to be tethered conveniently to the person of the user, such as by a clip at the waist or belt of the user. Alternately, the casing 10 may be conveniently carried in a pocket of the user such as a shirt or blouse pocket or a pants pocket.

As shown best in FIGS. 2 and 3, the outer surface 15 of the bottom casing 16 defines a coin holder 28 having one or a plurality of coin supporting locations, to accommodate a plurality of preselected coins, such as quarters. Where a plurality of coin-holding compartments are provided, one may hold quarters, while the other may hold dimes, for example. As shown, the coin holder 28 is defined by opposed walls 28a and 28b defining a plurality of opposed arcs 28c and 28d in register. The opposed arcs 28c and 28d are determined by the diameter of the coin to be held and may, for example, have the diameter of a quarter. The true diameter of the arcs 28c and 28d may be slightly smaller than a quarter so that the shrink fit of the quarter therein will be sufficient to frictionally engage the coin. However, alternate methods such as resilient walls 28a and 28b or more complex coin holding/release mechanisms may also be used.

The coin holder 28 is further defined by a base wall 30 and a side wall 32 (see FIG. 3) defined in the outer wall 15 of the lower casing 16. The depth of the coin holder from the wall 15 of the lower casing 16 is determined by whether one or more coins is to be stacked in each consecutive pair of circles defined by opposed arcs 28c and 28d. Usually, a single coin depth will be sufficient and would be most desirable to maximize the space within the interior cavity 26 defined by the lower casing 16.

While the direction of the coin holder 28 is along the length or longer wall of the casing 12, it may also be oriented from a long side wall orthogonally to that shown in FIG. 2, as diagrammatically shown in FIG. 4, parallel to a shorter wall of the casing 12. When so positioned, and if located near either opposed edge 14a and 14b, interference with the free space of the interior cavity 26 will be minimized.

Figure 7:
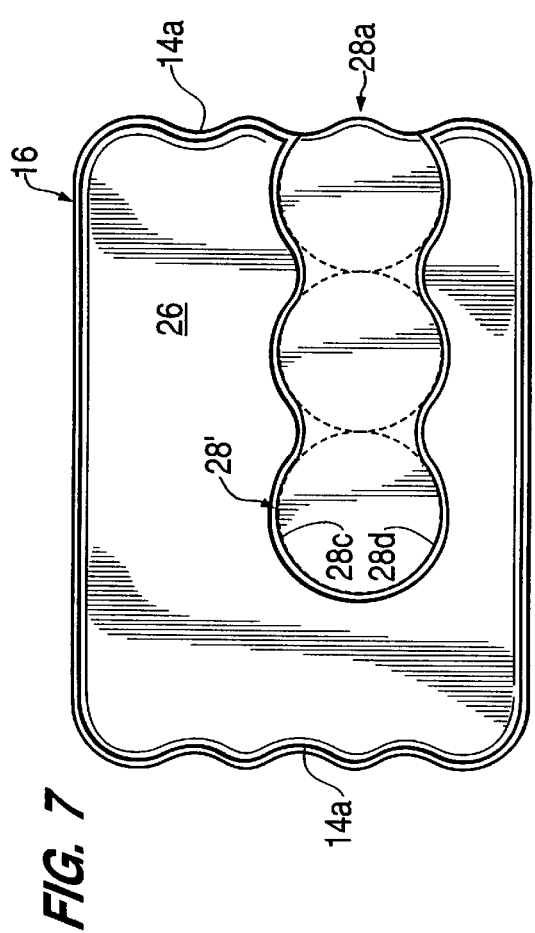
FIG. 7 is a view of the inside of the bottom of the casing showing an alternative embodiment wherein a coin holder is molded in the interior of the casing thereof.

The upper casing 14 is selectively secured to the lower casing 16 by any one of a number of ways known to the art. For example, the respective casings 14 and 16 may be secured by a frictional fit and capable of being separated by gripping each casing and pulling in opposite directions to separate them, as shown in FIG. 8. Alternatively, the casings may be secured by a releasable locking mechanism 40 which positively locks the casings 14 and 16 together when pressed together and which requires a release mechanism to separate the respective casings. Such releasable locking mechanisms are well known in the art of providing two-piece casings, especially for those casings made from a suitable plastic. Alternatively, the upper and lower casings may be providing with a pivot member about which the upper casing pivots relative to the lower member and a locking mechanism to secure the casings in a closed position as shown in FIGS. 1 to 3 and releasable to open the members as shown in FIG. 7. A representative latch having a tongue 41 on the base member with a detent for releasing the tongue 41 from its latching engagement with a latch bar 42 in the upper member is shown also in FIG. 8.

FIG. 7 is an interior view of the bottom casing 16 showing the interior cavity 26 with a coin holder 28' formed in the interior of the bottom casing rather than at the exterior as shown and discussed in FIG. 2. Like reference numerals are used to identify like parts for the respective holders 28' and 28.

Figure 9:
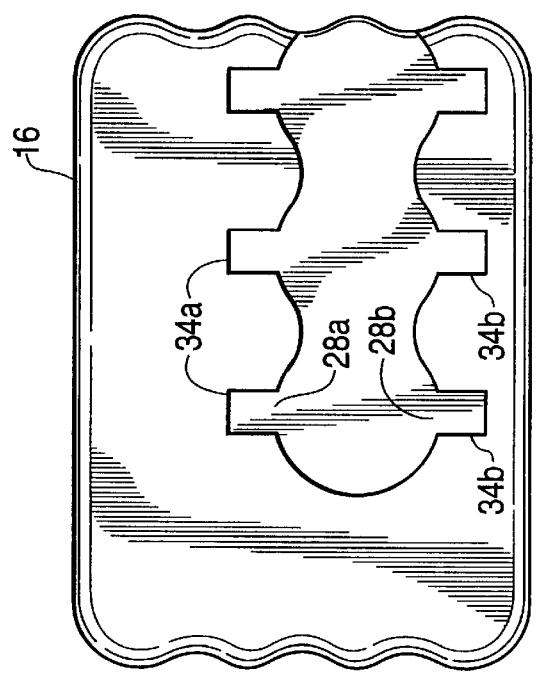
FIG. 9 is another view of the coin holder used in the invention wherein, in an alternative embodiment, finger-engaging access openings are provided to facilitate access to the coins.

In either of the embodiments of FIGS. 2 and 5, it may be convenient to part the walls 28a and 28b of the coin holder 28 periodically, such as at the opposed arcs 28c and 28d to facilitate retrieving coins from the holder. These alternatives are shown in FIG. 9. Specifically, the interior molded coin holder 28 in the embodiment of FIG. 2 may have opposed finger openings 34a and 34b respectively located at the arcs 28c and 28d. The finger openings 34a, 34b start at the surface 15 of the lower casing 16 and ramp downwardly to the base 30 of the coin holder 28, a side view of which is shown only in phantom in FIG. 3.

The described preferred embodiments of the invention were described in order to explain the principles of the invention and its practical application. The preceding description is thus intended to be illustrative of an embodiment to enable others skilled in the art to make and use the invention in various embodiments and with various modifications as are suited to the particular use contemplated. It is intended that the scope of the invention is defined by the appended claims.

What is claimed is:

1. In combination, a pager and a coin holder, the combination comprising:

a casing having a first portion and a second portion which releasably engages said first portion, said first portion and said second portion together defining therebetween a cavity within said casing;

a pager located substantially in said cavity, wherein communication features of said pager are positioned at an outer surface of said first portion; and a coin holder defined substantially by said second portion for releasably holding a plurality of predetermined coins, wherein said coin holder is defined substantially in a portion of the cavity defined by said second portion.

2. The combination pager and coin holder as set forth in claim 1, wherein said coin holder extends substantially perpendicularly to a longer wall of said casing.

3. The combination pager and coin holder as set forth in claim 1, wherein said coin holder ends substantially perpendicularly to a shorter wall of said casing 6.

4. The combination pager and coin holder as set forth in claim 1, wherein said coin holder is molded in the second portion of said casing and defines a plurality of coin-holding locations sized to frictionally engage coins of the same denomination in each location.

5. The combination pager and coin holder as set forth in claim 4 wherein each of said coin-holding locations includes a finger-accessing portion accessing said locations to assist retrieving coins from said coin holder.

6. The combination pager and coin holder set forth in claim 1, wherein said pager is formed integrally with said first portion.

7. The combination pager and coin holder set forth in claim 1, further comprising a latch comprising a tongue which engages a detent, said latch releasably securing said first and second casing portions to each other.

8. The combination pager and coin holder set forth in claim 1, wherein said cavity is sufficiently sized to receive at least one article of personalty.

9. The combination pager and coin holder set forth in claim 1, wherein said at least one article of personalty is identification.

10. In combination, a pager and a coin holder, the combination comprising:

a casing having a first portion and a second portion which releasably engages said first portion, said first portion and said second portion together defining therebetween a cavity within said casing which is totally enclosed when said first and second portions are engaged, said first portion defining a first outer surface of said casing, said second portion defining a second outer surface of said casing, said casing having a rectangular configuration with a longer side and a shorter side;

a pager located substantially in a portion of said cavity defined by said first portion, wherein communication features of said pager are positioned at said first outer surface of said first portion, said communication features including displays for messages and means for sending messages by enabling a switch; and a coin holder defined substantially by said second portion for releasably holding a plurality of predetermined coins, said coin holder having a pair of opposed walls respectively defining apexes and nadirs along a given direction, said opposed apexes defining arcs of a circle having a diameter corresponding to the diameter of a coin of a predetermined denomination to be frictionally engaged by said opposed arc, said coin holder having a thickness defined in said second portion for holding more than one coin of said predetermined denomination, wherein said coin holder is defined substantially in a portion of the cavity defined by said second portion.

11. The combination pager and coin holder as set forth in claim 10, wherein said coin holder extends substantially perpendicularly to said longer side of said casing.

12. The combination pager and coin holder as set forth in claim 10, wherein said coin holder ends substantially perpendicularly to said shorter side of said casing.

13. The combination pager and coin holder as set forth in claim 10, wherein said coin holder is molded in said second portion of said casing and defines a plurality of coin-holding location sized to frictionally engaged coins of the same denomination in each location.

14. The combination pager and coin holder as set forth in claim 13 wherein each of said coin-holding locations includes a finger-accessing portion accessing said location to assist retrieving coins from said coin holder.

* * * * *